May 6, 1952  G. EICHELBERG  2,595,932
SCAVENGING TWO-CYCLE ENGINE
Filed July 2, 1947  2 SHEETS—SHEET 1
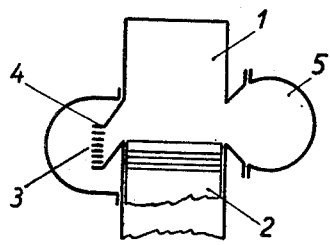
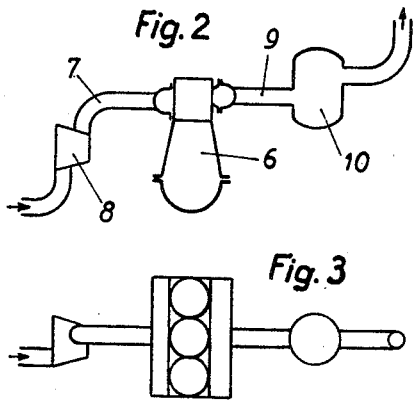
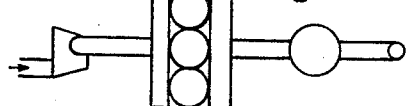
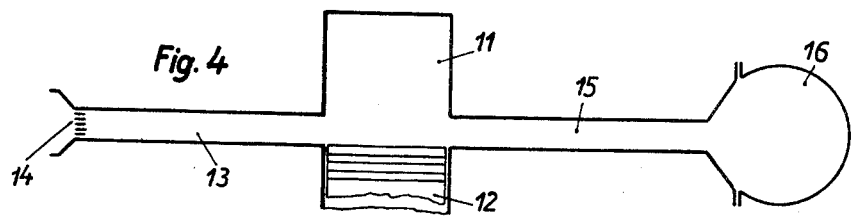
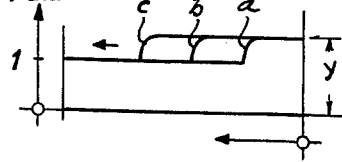
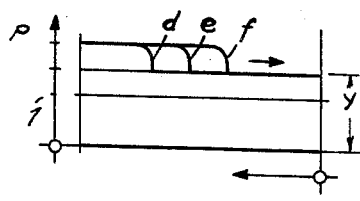
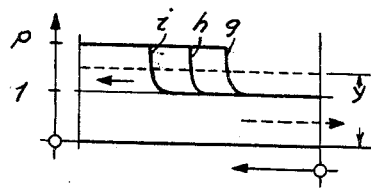
INVENTOR
GUSTAV EICHELBERG
BY Young, Emery & Thompson
ATTYS.

May 6, 1952     G. EICHELBERG     2,595,932
SCAVENGING TWO-CYCLE ENGINE
Filed July 2, 1947     2 SHEETS—SHEET 2

INVENTOR
GUSTAV EICHELBERG
BY Young, Emery & Thompson
ATTYS-

Patented May 6, 1952

2,595,932

UNITED STATES PATENT OFFICE 2,595,932

SCAVENGING TWO-CYCLE ENGINE

Gustav Eichelberg, Zurich, Switzerland, assignor to Gesellschaft zur Forderung der Forschung an der Eidg. Technischen Hochschule, Zurich, Zurich, Switzerland, a firm of Switzerland Application July 2, 1947, Serial No. 758,550
In Switzerland July 20, 1946

4 Claims. (Cl. 123—65)

As is well known, the scavenging of two-stroke internal combustion engines is effected by the outlet ports of the cylinder being uncovered before the piston reaches the lower dead centre, so that an emptying of the cylinder occurs, which is accompanied by a fall in pressure. Exhaust gases must then be prevented from entering the scavenging air container, and this is effected by providing non-return valves after the scavenging ports. The passage between the scavenging ports and the non-return valves is kept as short as possible in order that the scavenging air may not be contaminated with exhaust gas. As soon as the pressure in the cylinder has reached the scavenging air pressure, the non-return valves open and scavenging commences, i. e. fresh air flows from the scavenging air container through the scavenging ports and sweeps out the products of combustion. Since the scavenging pressure is higher than the outside pressure, a special compressor is provided to bring the scavenging air up to the necessary pressure.

In Figs. 1–3 of the accompanying drawing, a plant as hitherto constructed is illustrated diagrammatically; here:

Fig. 1 is a section through the cylinder;

Fig. 2 an elevation of a two-stroke engine, illustrated diagrammatically;

Fig. 3 the plan of the engine shown in Fig. 2;

Fig. 4 is a diagrammatic view showing the arrangement of the inlet and outlet pipes;

Figs. 5 to 7 are diagrams showing the course taken by the pressure waves;

Figure 8:
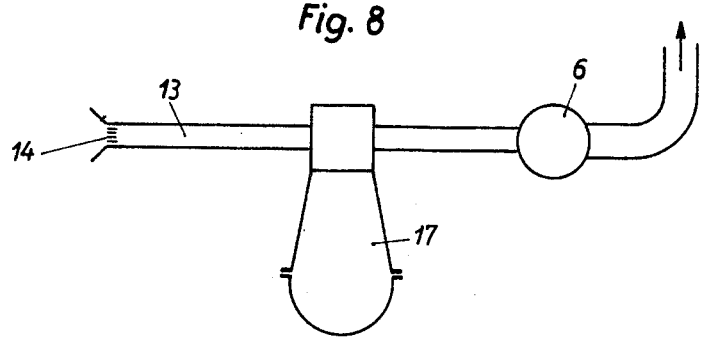
Fig. 8 is a diagrammatic view showing a plant in elevation.

In the cylinder 1 the piston 2 reciprocates and controls the scavenging ports which lead to the scavenging air container 3 and are closed by non-return valves 4. The exhaust pipe is indicated at 5. In Fig. 2 the engine is indicated at 6, the scavenging air pipe 7 leads to a compressor 8, whilst the exhaust pipe 9 leads to a cylinder 10 and from there to atmosphere.

In the known form of plant as illustrated diagrammatically in Figs. 1–3, a special compressor is needed, as already mentioned; it has to supply the whole compression work required to bring the scavenging air up to the necessary pressure.

The subject matter of the present invention consists in a special method of scavenging and an arrangement for carrying it out, in connection with which a special compressor for preparing the scavenging air is no longer required at all, or in certain cases a compressor of considerably reduced capacity will be sufficient. The method is characterised in that, after combustion and after the corresponding ports are uncovered by the piston, the emptying of the cylinder takes place both into the exhaust pipe and also into the scavenging air pipe, and thereby pressure waves moving away from the cylinder are propagated in both pipes, the pressure wave in the exhaust pipe being reduced to outside pressure at the end of the pipe, whilst the pressure wave in the scavenging pipe on the other hand is reflected at its end by the closed non-return valves provided there, and thereby dammed, so that the reflected wave travelling back to the cylinder which has meanwhile emptied, on reaching the cylinder produces a wave of rarefaction in the scavenging pipe, thus causing a high velocity of flow in the direction towards the cylinder and starting the scavenging, so that the depression arising at the end of the tube in consequence of the reflection on the non-return valves opens these valves and air therefore flows from outside as scavenging air towards the cylinder.

The arrangement for carrying out the method is characterised by the inlet ports being connected to a pipe whose length amounts to a multiple of the diameter of the cylinder, and that at the end of this pipe non-return valves are provided.

In Figs. 4–9 of the accompanying drawing, one embodiment of the object of the invention is illustrated by way of example for the case where no compressor is used.

According to Fig. 4 which diagrammatically shows the scavenging of a two-cycle engine in which a cylinder 11 having a piston 12 which control inlet and outlet openings by means of which the cylinder is in communication with a scavenging pipe 13 and an outlet pipe 15. The latter communicates with an open silencer 16. The scavenging pipe has non-return valves 14 at the end opposite to the cylinder end which normally are closed and has a length which is many times, for example 8 to 12 times, the diameter of the cylinder.

Figs. 5 to 7 graphically illustrate the pressure relationship in the exhaust pipe and in the scavenging pipe relative to different time moments $a$ to $i$. The abscissa of the graph represent the path of the particular pipe from the cylinder. As the ordinates are represented the pressure $P$ in atmospheres, the ordinate $l$ represents atmospheric pressure.

After the combustion of the gas-air mixture in the cylinder the openings in the exhaust pipe (right) as also the scavenging pipe (left) will be uncovered by the piston simultaneously or the inlet openings will be opened shortly after the outlet openings in a time relationship which are comparable to the pressure in the scavenging pipe and the outlet pipe by the higher pressure in the cylinder. The pressure $y$ represents, therefore, the pressure in both pipes from the cylinder as shown in Fig. 5 for different time periods $a$, $b$ and $c$. Since the pressure in the outlet pipe which is open at one end to the atmospheric pressure varies in the right half of Fig. 6 in different time moments, $d$, $e$ and $f$ representing the dilution in the outlet pipe relative to the cylinder which is emptied.

Simultaneously or temporarily the pressure wave created in the scavenging pipe will be only slightly displaced toward the closed valve at the end of the pipe and will be choked and reflected so that a reflection wave will be directed back to the cylinder as shown in the left half of Fig. 6 for the time moments $d$, $e$ and $f$. While the pressure in the outlet pipe falls relative to atmospheric pressure, then the pressure in the scavenging pipe will be increased. As long as the scavenging pipe is large enough that the pressure wave from the cylinder to the valves and the reflection wave from the valves back to the cylinder during the outlet flow is strong against atmospheric pressure, then the reflection wave in the cylinder will be attained. The produced great pressure difference in the scavenging pipe in the cylinder is due to a strong dilution wave which will be quickly evident in the scavenging pipe from the cylinder against the non-return valves, as seen in Fig. 7 by the sequence following time moments $g$, $h$ and $i$. The dilution wave will be reflected at the non-return valves whereby an underpressure relative to atmospheric pressure will be attained so that the valve will be automatically opened and fresh air will be sucked into the scavenging pipe. The fresh air will flow against the reflecting wave with great speed into the cylinder to scavenge the same.

Since the invention does not use any resonance principles, the scavenging operation is entirely independent from the speed of the motor, since to attain the desired effects, it is sufficient that the pressure in the cylinder is as low as possible, relative to the atmospheric pressure. It is not necessary that the pressure shall be a definite value.

Figure 9:
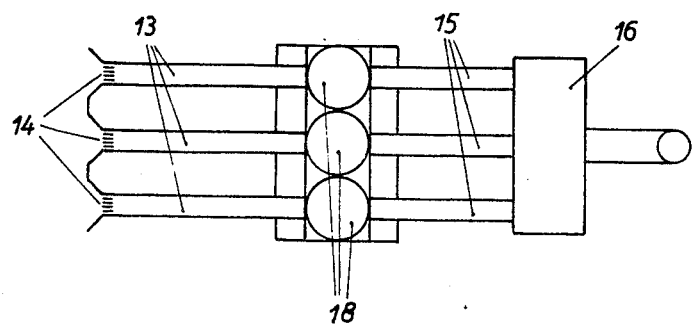
Fig. 9 is a similar view showing the plant of Fig. 8 in plan.

Figs. 8 and 9 illustrate diagrammatically how a two-cycle motor 17 with, for example, three cylinders 18 is provided with scavenging means according to the invention. At each cylinder there is provided its own inlet pipe 13 and its own outlet pipe 15 whereby each scavenging pipe will have a closed non-return valve for its cylinder remote therefrom and having a length which is a multiple, for example, 8 to 12 times the diameter of the cylinder. The ends remote from the cylinder of the outlet pipes 15 terminate into a common silencer 16.

By the invention, a scavenging in two-cycle engines is carried out with simple means without the use of a blower or like devices.

By the method according to the invention and the arrangement for carrying it out, perfect scavenging is obtained, the power required for preparing the scavenging air, i. e. the work of the compressor and thereby the compressor itself, being either entirely eliminated, or at any rate only required to a considerably reduced extent. The efficiency of the plant will therefore increase, quite apart from the advantages that the arrangement according to the invention brings about a considerable simplification and cheapening of the plant.

I claim:

1. A method of scavenging a two-cycle engine cylinder having an exhaust pipe and an inlet pipe leading from piston-controlled ports therein, said inlet pipe having non-return valves, normally closed, located at its end remote from the cylinder, which consists in opening both the exhaust ports and the inlet ports by the piston substantially simultaneously after combustion at a moment when the pressure in the cylinder is still high with respect to the pressure in both the exhaust and the inlet pipes, so that the products of combustion first flow from the cylinder into both said pipes, reflecting back the pressure wave in the inlet pipe by the non-return valves, reducing the pressure wave in the exhaust pipe to outside pressure, whereby the pressure in the cylinder is substantially relieved before the reflected wave reaches the cylinder, opening the said non-return valves automatically by the reduced pressure thus produced in the inlet pipe and drawing in by the same reduced pressure a charge of fresh air which flows into the cylinder at a high velocity, and thereby scavenging the same.

2. A method of scavenging a two-cycle engine cylinder as set forth in claim 1, in which upon opening the exhaust ports by the piston some moments before opening the inlet ports, the pressure in the cylinder still being high when said inlet ports are opened.

3. A scavenging system for two-cycle engines with at least one cylinder with piston controlled ports, comprising an exhaust pipe and an inlet pipe leading from the piston controlled ports in the cylinder, said exhaust pipe having an open end, and non-return valves normally closed located at the end remote from the cylinder of said inlet pipe, the length of said inlet pipe being substantially 8 to 12 times the diameter of the cylinder.

4. A scavenging system for a two-cycle multi-cylinder engine with each cylinder provided with piston controlled ports, comprising an exhaust pipe and an inlet pipe for each cylinder leading from the piston controlled ports in each cylinder, said exhaust pipes having an open end, the length of each of said inlet pipes being substantially 8 to 12 times the diameter of the cylinder, non-return valves normally closed and located at the end remote from the cylinder of each of said inlet pipes.

GUSTAV EICHELBERG.

REFERENCES CITED

The following references are of record in the file of this patent:

UNITED STATES PATENTS

| Number | Name | Date |
|---|---|---|
| 744,881 | Sohnlein | Nov. 24, 1903 |
| 1,043,254 | Russell | Nov. 5, 1912 |
| 1,092,109 | Kempton | Mar. 31, 1914 |
| 1,407,586 | Setz | Feb. 21, 1922 |
| 2,055,338 | Curtis | Sept. 22, 1936 |
| 2,206,632 | Cornish et al. | July 2, 1940 |
| 2,281,585 | Kadenacy | May 5, 1942 |
| 2,431,266 | Mansfield et al. | Nov. 18, 1947 |

FOREIGN PATENTS

| Number | Country | Date |
|---|---|---|
| 402,333 | Great Britain | 1933 |
| 553,965 | Great Britain | 1943 |